(12) United States Patent
Kanuparthy et al.

(10) Patent No.: US 10,929,573 B2
(45) Date of Patent: Feb. 23, 2021

(54) SYSTEMS AND METHODS FOR DESIGNING AND MODELING PRODUCTS IN A CLOUD ENVIRONMENT

(71) Applicant: The Boeing Company, Chicago, IL (US)

(72) Inventors: Narasimha Murthy Kanuparthy, Sammamish, WA (US); Bruce Lydell Nelson, Woodinville, WA (US); John Merrill Higginson, Issaquah, WA (US); Erich Gunther Schuller, Maple Valley, WA (US); Earl Manlangit, Lynnwood, WA (US); Shane T. Peterson, Covington, WA (US)

(73) Assignee: THE BOEING COMPANY, Chicago, IL (US)

( * ) Notice: Subject to any disclaimer, the term of this patent is extended or adjusted under 35 U.S.C. 154(b) by 142 days.

(21) Appl. No.: 15/464,788

(22) Filed: Mar. 21, 2017

(65) Prior Publication Data
US 2018/0276315 A1 Sep. 27, 2018

(51) Int. Cl.
*G06F 30/15* (2020.01)
*G06F 30/00* (2020.01)
(Continued)

(52) U.S. Cl.
CPC .............. *G06F 30/00* (2020.01); *G06F 30/15* (2020.01); *H04L 47/82* (2013.01);
(Continued)

(58) Field of Classification Search
CPC ............................ G06F 17/50; G06F 2217/04
See application file for complete search history.

(56) References Cited

U.S. PATENT DOCUMENTS

| 5,128,878 A * | 7/1992 | Gore | ...................... G06F 3/1296 |
| | | | 345/502 |
| 6,226,690 B1 * | 5/2001 | Banda | ...................... H04L 67/42 |
| | | | 709/202 |

(Continued)

FOREIGN PATENT DOCUMENTS

| GB | 2497156 A | 5/2013 | |
| WO | WO-0013085 A1 * | 3/2000 | ............. G06F 9/542 |

OTHER PUBLICATIONS

Friedman, Jonathan, Newton Truong, and Mani B. Srivastava. "A Unified CAD-PLM architecture for improving electronics design productivity through automation, collaboration, and cloud computing." Proceedings of the IPC APLEX EXPO Technical Conference. 2011. (Year: 2011).*

(Continued)

*Primary Examiner* — Omar F Fernandez Rivas
*Assistant Examiner* — David A Hopkins
(74) *Attorney, Agent, or Firm* — MH2 Technology Law Group LLP

(57) ABSTRACT

Systems, computer readable media, and method concern receiving a processing request associated with a design or modeling of a product. The method also includes initiating one or more processes in a cloud for the processing request. Resources of the cloud are allocated based at least partially on requirements of the processing request and launch specifications. Further, the method includes establishing a channel between the one or more processes and a product design computer based at least partially on process specification. The product design computer is located remotely from the cloud, and the channel translates data between the one or more processes and the product design computer. The method also include outputting a result of the one or more processes to a requester associated with the process request.

20 Claims, 6 Drawing Sheets

(51) Int. Cl.
    *H04L 12/911*     (2013.01)
    *G06F 111/02*     (2020.01)
    *G06F 111/20*     (2020.01)
    *G06F 119/18*     (2020.01)

(52) U.S. Cl.
    CPC ....... *G06F 2111/02* (2020.01); *G06F 2111/20* (2020.01); *G06F 2119/18* (2020.01)

(56) References Cited

U.S. PATENT DOCUMENTS

| | | | | |
|---|---|---|---|---|
| 8,588,990 | B2* | 11/2013 | Caceres | H04L 12/2803 700/295 |
| 8,621,069 | B1* | 12/2013 | Tompkins | G06F 9/5027 709/224 |
| 9,529,618 | B2* | 12/2016 | Borntraeger | H04L 67/1008 |
| 9,923,952 | B2* | 3/2018 | Maes | H04L 67/10 |
| 9,954,718 | B1* | 4/2018 | Qin | H04L 29/08 709/203 |
| 2011/0161465 | A1* | 6/2011 | Kowalski | H04L 67/2823 709/219 |
| 2011/0246653 | A1* | 10/2011 | Balasubramanian | G06F 17/5045 709/226 |
| 2012/0239634 | A1* | 9/2012 | Chen | G06F 16/2365 707/703 |
| 2013/0151598 | A1* | 6/2013 | Fu | H04L 67/42 709/203 |
| 2014/0325486 | A1* | 10/2014 | Zhang | G06F 11/3692 717/125 |
| 2015/0350101 | A1* | 12/2015 | Sinha | G06F 9/45533 709/226 |
| 2016/0098034 | A1* | 4/2016 | Hanlin | G05B 19/4188 700/26 |

OTHER PUBLICATIONS

Tian Zhiman, Lin Qi, Yang Guangwen, "Application of Grid Computing in Aircraft design", 27th International Congress of Aeronautical Sciences, 2010; http://www.icas.org/ICAS_ARCHIVE/ICAS2010/PAPERS/163.PDF (Year: 2010).*

Castillo, Pedro A., et al. "Using SOAP and REST web services as communication protocol for distributed evolutionary computation." International Journal of Computers & Technology 10.6 (2013): 1752-1770. (Year: 2013).*

Steinmetz, Christian, Alexander Christ, and Reiner Anderl. "Data management based on internet technology using restful web services." Proceedings of the 10th International Workshop on Integrated Design Engineering. 2014. (Year: 2014).*

Ma, Songhua, and Ling Tian. "A web service-based multidisciplinary collaborative simulation platform for complicated product development." The International Journal of Advanced Manufacturing Technology 73.5-8 (2014): 1033-1047. (Year: 2014).*

Wang, Sixuan, et al. "Solutions for scalability in building information modeling and simulation-based design." Proceedings of the symposium on simulation for architecture & urban design. Society for Computer Simulation International, 2013. (Year: 2013).*

The Authoritative Dictionary of IEEE Standards Terms, Seventh Edition, in IEEE Std 100-2000, vol., No., pp. 1-1362, Dec. 11, 2000doi: 10.1109/IEEESTD.2000.322230URL: http://ieeexplore.ieee.org/stamp/stamp.jsp?tp=&arnumber=4116787&isnumber=4116786 (Year: 2000).*

Data translation. (2010). In S. M. H. Collin (Ed.), Dictionary of computing (6th ed.). London, UK: Bloomsbury. Retrieved from https://search.credoreference.com/content/entry/acbcomp/data_translation/0?institutionId=743 (Year: 2010).*

Steinmetz, Christian, Alexander Christ, and Reiner Anderl. "Data management based on internet technology using restful web services." Proceedings of the 10th International Workshop on Integrated Design Engineering. 2014. (Year: 2014).*

Han, Hyuck, et al. "A RESTful approach to the management of cloud infrastructure." 2009 IEEE International Conference on Cloud Computing. IEEE, 2009. (Year: 2009).*

Yang, Jeongsam, et al. "OpenPDM-based product data exchange among heterogeneous PDM systems in a distributed environment." The International Journal of Advanced Manufacturing Technology 40.9-10 (2009): 1033-1043. (Year: 2009).*

Frame, "Frame for CAD: Best practices for configuring, managing, and running CAD applications on the cloud", Jul. 2016, accessed at https://fra.me/cad/frameforcad.pdf (Year: 2016).*

Gerbino, Salvatore, and A. Brondi. "Interoperability issues among CAD systems: a benchmarking study of 7 commercial MCAD software." DS 32: Proceedings of DESIGN 2004, the 8th International Design Conference, Dubrovnik, Croatia. 2004. (Year: 2004).*

Paviot, Thomas, Samir Lamouri, and Vincent Cheutet. "A generic multiCAD/multiPDM interoperability framework." (2011). (Year: 2011).*

Azu Jr, Charles C. An application protocol for CAD to CAD transfer of electronic information. Naval Command Control and Ocean Surveillance Center RDT and E Div San Diego CA, 1993. (Year: 1993).*

Architosh, by Anthony Frausto-Robledo, "Autodesk and Frame just put Revit on the MAC, Offically", Dec. 2015, accessed at: https://architosh.conn/2015/12/autodesk-and-frame-just-put-revit-on-the-mac-officially/ (Year: 2015).*

Mike Thomas et al., "Is there a place in the cloud for product data Management ?", 2015, BeyondPLM, accessed at http://beyondplm.com/2015/12/24/is-there-a-place-in-the-cloud-for-product-data-management-pdm/ (Year: 2015).*

Kennedy, Sean, et al. "StoRHm: a protocol adapter for mapping SOAP based Web Services to RESTful HTTP format." Electronic commerce research 11.3 (2011): 245-269. (Year: 2011).*

Cohen, Michael. "Forensic analysis of windows user space applications through heap allocations." 2015 IEEE Symposium on Computers and Communication (ISCC). IEEE, 2015. (Year: 2015).*

The article "Linux memory Management 'GO'", last updated Sep. 29, 2015 and hosted on Alibaba's Cloud as a blog for Developers (Year: 2015).*

Kim, SeokRyul, and Daniel Weissmann. "Middleware-based integration of multiple CAD and PDM systems into virtual reality environment." Computer-Aided Design and Applications 3.5 (2006): 547-556. (Year: 2006).*

Extended European Search Report dated Jul. 23, 2018 in corresponding European Application No. 18151288.0.

Andreadis et al., "Collaborative Design in the Era of Cloud Computing," Advances in Engineering Software, vol. 81, Mar. 1, 2015, pp. 66-72.

Wikipedia, "Cloud Computing" May 22, 2015, downloaded from the internet Aug. 2, 2016, https://en.wikipedia.org/w/index.php?title=cloud_computing&oldid=663563682.

Wikipedia, "Autoscaling," Jan. 22, 2017, retrieved from the internet on Apr. 9, 2018, https://en.wikipedia.org/w/index.php?title=autoscaling&oldid=761272179.

Communication Pursuant to Article 94(3) EPC issued Sep. 22, 2020 in corresponding European Application No. 18151288.0, 8 pages.

* cited by examiner

SYSTEMS AND METHODS FOR DESIGNING AND MODELING PRODUCTS IN A CLOUD ENVIRONMENT

BACKGROUND

Currently, products are developed, designed, and redesigned using computers to visualize and modify a products' design. For example, when designing aircraft, companies utilize computerized design tools such as computer aided design applications, product life cycle management applications, financial applications, and the like. These design tools, however, can be computer processing intensive and may require customized and expensive computer hardware. For example, when designing an aircraft, some design tools can require a significant amount of time (e.g. over eight hours) to generate a visualization model for the aircraft following a design change. This is further complicated because separate designers can be working on the product, and the visualization models may be out-of-date by the time a visualization model is generated. Thus, there is a need for design tools that assist product design and development without the above problems and challenges among other problems and challenges.

SUMMARY

Aspects of the present disclosure concern a method that includes receiving a processing request associated with a design or modeling of a product. The method also includes initiating one or more processes in a cloud for the processing request. Resources of the cloud are allocated based at least partially on requirements of the processing request and launch specifications. Further, the method includes establishing a channel between the one or more processes and a product design computer based at least partially on process specification. The product design computer is located remotely from the cloud, and the channel translates data between the one or more processes and the product design computer. The method also include outputting a result of the one or more processes to a requester associated with the process request.

Additional aspects of the present disclosure concern a system that includes one or more memory devices storing instructions, and one or more processors coupled to the one or more memory devices and configured to execute the instructions to perform a method. The method includes receiving a processing request associated with a design or modeling of a product. The method also includes initiating one or more processes in a cloud for the processing request. Resources of the cloud are allocated based at least partially on requirements of the processing request and launch specifications. Further, the method includes establishing a channel between the one or more processes and a product design computer based at least partially on process specification. The product design computer is located remotely from the cloud, and the channel translates data between the one or more processes and the product design computer. The method also include outputting a result of the one or more processes to a requester associated with the process request.

Additional aspects of the present disclosure concern a non-transitory computer readable medium storing instructions for causing one or more processors to perform a method. The method includes receiving a processing request associated with a design or modeling of a product. The method also includes initiating one or more processes in a cloud for the processing request. Resources of the cloud are allocated based at least partially on requirements of the processing request and launch specifications. Further, the method includes establishing a channel between the one or more processes and a product design computer based at least partially on process specification. The product design computer is located remotely from the cloud, and the channel translates data between the one or more processes and the product design computer. The method also include outputting a result of the one or more processes to a requester associated with the process request.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1:
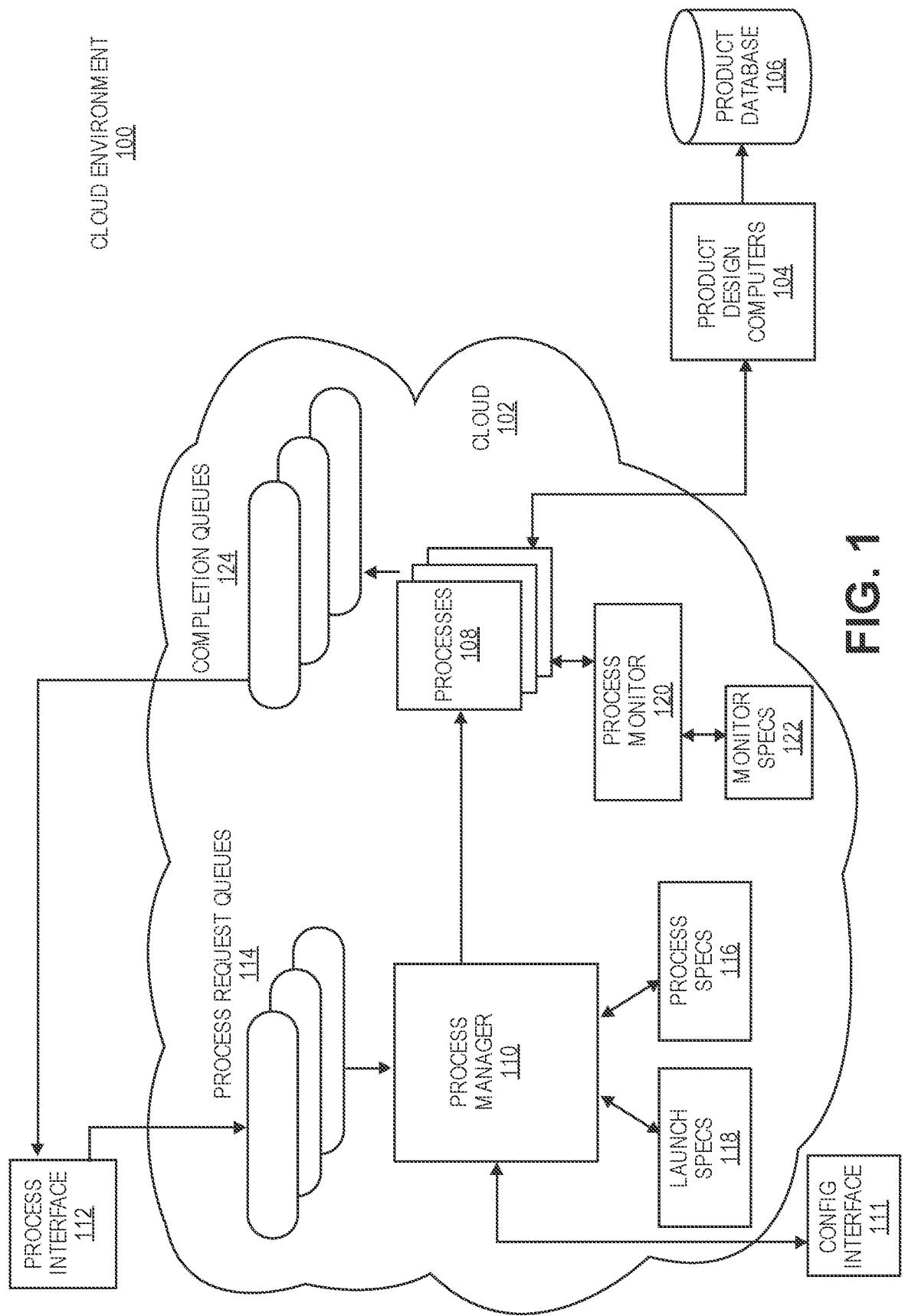
FIG. 1 illustrates an example of a cloud environment for designing, modeling, and maintaining a product, according to various aspects of the present disclosure.

FIG. 1 illustrates a cloud environment 100 in which a product can be designed, modeled, and maintained, according to aspects of the present disclosure. While FIG. 1 illustrates various components contained in the design environment 100, FIG. 1 illustrates one example of a cloud environment and additional components can be added and existing components can be removed.

As illustrated in FIG. 1, the cloud environment 100 includes a cloud 102. The cloud 102 can be any type of architecture that combines and manages computing resources to provide flexible and configurable computer processes. In one example, the cloud 102 can be a public cloud services (e.g., Google cloud, Amazon™ EC2, etc.), a private cloud, or combination thereof. The cloud 202 includes a set of physical machines that can host one or more computer processes. The physical machines can be any computing resources such as computers, servers, hosts, storage, and other resources, and can comprise any type of hardware or software components. Each of the physical machines can be configured to host one or more virtual machines (VMs). In particular, the VMs can be any software implementation of a machine or computer that can execute a program or application using underlying hardware of the respective physical machine. The VMs can be system VMs capable of executing a complete operating system (OS) or process VMs capable of executing one or more programs or applications. It should be appreciated that the number, type, functionality, and extent of each of the VMs can vary based on the underlying physical machine, any requirements, or other factors.

In aspects, the cloud environment 100 includes one or more product design computers 104 coupled to the cloud 102. The product design computers 104 provide computer design and management for a product offered by an entity. The product design computers 104 can represent the computer systems and network hardware of public or private entities, such as governmental agencies, individuals, businesses, partnerships, companies, corporations, etc., utilized to design and manage products for the entities. The product design computers 104 can be any type of computer system that is operating in the cloud environment 100 or supporting the cloud environment 100 and suitable for the applications described herein. For example, the product design computer 104 can include various types of servers, such as file servers, web servers, application servers, database servers, email servers and the like, that provide services within the cloud environment 100. Likewise, for example, the product design computers 104 can include laptop computers, desktop computers, tablet computers, mobile phones, and the like used by the personnel of the entities.

The product design computers 104 are coupled to one or more product databases 106. The product databases 106 can be configured to store any information on products designed, re-designed, revised, manufactured, sold, or modified by an entity. For example, the information can include design specifications of the product, parts and components included in the product, cost of manufacture of the product, cost of parts and components included in the product, maintenance procedures and cost of the life cycle of the product, and the like. The products being designed and managed by the cloud 102 can be any type of product designed, manufactured, sold, etc. by an entity. For example, as discussed below, the product can be an aircraft designed, manufactured, and sold an entity such as the Boeing Company.

Additionally, for example, the cloud environment 100 includes other hardware and computer systems that support the cloud environment 100. For example, the cloud environment 100 can include gateways, routers, wireless access points, firewalls, and the like that support any type of communications network to allow the computing systems in the cloud environment 100 to communicate. In any of the examples, the computer systems, including the product design computers 104 and the computing resources of the cloud 102, in the cloud environment 100 include hardware resources, such as processors, memory, network hardware, storage devices, and the like, and software resources, such as OSes, application programs, and the like.

According to aspects, the cloud 102 is configured to work in cooperation with the product design computer 104 to provide flexible and configurable computing resources for designing, re-designing, modeling, revising, and managing products offered by an entity. The cloud 102 is configured to initiate and mange one or more processes 108 supporting the design, modeling, and management of the products. The processes 108 are configured to provide computing processing in the design, modeling, and management of a product of the entity. The processes 108 can provide computing processing to support any process, action, program, and the like associated with the design, modeling, and management of a product. For example, as described below, the processes 108 can provide computing resources for computer aided design (CAD) processes for designing and modeling an aircraft.

To facilitate interoperability, the cloud 102 can include a process manager 110 that is capable of storing and retrieving instructions. The process manager 110 provides a framework that establishes a communication channel between the processes 108, the product design computer 104, and the product database 106, when the process 108, the product design computer 104, and the product database 106 utilize different communication protocols, utilize different formats of data, requires unique setting and parameters, and the like. The communication channel can be isolated and independent from any other communication channels between other processes, the product design computer 104, and the product database 106. The process manager 110 also provides a framework that allocates and initiates computing resources from the cloud 102 that are tailored to the processes 108. By utilizing the process manager 110 in the cloud 102, design, modeling, and maintained processes can be supported without the requirement of dedicated hardware for the processes. Likewise, by utilizing the process manager 110, the interoperability of different program and processes can be simplified and standardized for different and unique situations. Further, by tailoring computing resources to the process 108, the processing times for the processes 108 can be reduced, which increases efficiency and availability of results. Additionally, by reducing processing times, multiple product designers can operate in near real-time and share results.

The process manager 110 configures and initiates the processes 108 on the set of computing resources of the cloud 102. In an example, the process manager 110 can be configured as a software program including instructions that is capable of being stored on and executed by the computer resources of the cloud 102. The process manager 110 can be written in a variety of programming languages, such as JAVA, C++, C#, Python code, Visual Basic, hypertext markup language (HTML), extensible markup language (XML), .NET, and the like to accommodate a variety of operating systems, computing system architectures, etc. In another example, the process manager 110 can be configured as dedicated hardware operating software programs in the cloud 102.

The process manager 110 is configured to operate, at least partially, under the control of a user. To receive input and output results to the user, the process manager 110 is configured to generate and provide a configuration interface 111. The configuration interface 111 can be any type of command line and/or graphical user interface (GUI) that allows the user to interact with the process manager 110. The process manager 110 is configured to provide, via the configuration interface 111, controls, forms, reports, etc., to allow the user to interact with the process manager 110 and perform the processes described herein.

To perform design and modeling in the cloud 102, the cloud environment 100 includes a process interface 112. The process interface 112 can be configured to receive a process request and forward the process request to the cloud 102. The process interface 112 can be any type of command line and/or GUI that allows the user to provide process requests to the cloud 102. The process interface 112 is configured to provide controls, forms, reports, etc., to allow the user to interact with the cloud 102 and perform the processes described herein. The process request can includes parameters and requirements of the design, modeling, or maintenance actions.

To receive the process request, the cloud 102 includes one or more process request queues 114 accessible by the process manager 110. The process request queues 114 can be any type of data structure, supported by the computing resources of the cloud 102, which stores the process requests until retrieved by the process manager 110. For example, the process request queues 114 can be first-in-first-out queues.

Once retrieved from the process request queues, the process manager 110 is configured to initiate the one or more processes 108 to perform the requested process. To initiate the processes 108, the process manager 110 utilizes process specification 116 and launch specifications 118. The process specification 116 defines a protocol for communicating and converting data from the product design server 104 and the product database 106 to be used by the processes 108 and vice versa. For example, the process specification 116 can define a protocol establishes a channel (e.g., a secure channel) between the processes 108 and the product design server 104 and the product database 106 and defines conversion and interpretation of the data received from and sent to the product design server 104 and the product database 106. Additionally, the process specification 116 defines a protocol to translate data from the process request into the processes 108.

The launch specification 118 define hardware and software requirements for creation and initiation of the processes 108. For example, the launch specification 118 can define predetermined hardware resources allocation (e.g., memory requirement, CPU requirement, storage requirements, etc.) for various parameters process requests and the processes 108.

To create and initiate the processes 108, the processes manager 110 can parse the process request and compare the parameters of the process request to the process specification 116 to determine the requirements of a channel to the product design. Likewise, the process manager 110 can parse the process request and compare the parameters of the process request to the launch specifications 118 to determine an allocation of the resources of the cloud 102 that allows the processes 108 to execute efficiently and effectively. Once determined, the process manager 110 can initiate the processes 108 and establish the channel with the product design computer 104. The channel can be isolated and independent from other channels from processes in the cloud 102.

The cloud 102 includes a process monitor 120. The process monitor 120 can monitor the processes 108 for one or more events, such as an error, an over utilization of computing resources, and an underutilization of computing resources, and the like. In an example, the process monitor 120 can be configured as a software program including instructions that is capable of being stored on and executed by the computer resources of the cloud 102. The process monitor 120 can be written in a variety of programming languages, such as JAVA, C++, C#, Python code, Visual Basic, HTML, XML, .NET, and the like to accommodate a variety of operating systems, computing system architectures, etc. In another example, the process monitor 120 can be configured as dedicated hardware operating software programs in the cloud 102.

The process monitor 120 can access monitor specifications 122. The monitor specifications 122 can define various events that occur in the processes 108 and solutions for addresses the events. For example, the monitor specifications 122 can define common errors that occur in the operation of the processes 108 and solutions for addressing the errors. Once the process monitor 120 detects an event, the process monitor 120 can access the monitor specifications 122 to identify the event and take actions to address the event. In some examples, the process monitor 120 can communicate with the process manager 110 to address a detected event. For example, if the processes 108 are experiencing a slowdown in processing, the process monitor 120 can communicate with the process manager 110 to allocate additional resources of the cloud 102 to the processes 108. By utilizing the process monitor 120, debugging and fault recovery and be seamlessly automated and improved.

The cloud 102 also includes one or more completion queues 124. The completion queues 124 can be configured to store the results of the processes 108. The completion queues 124 can be any type of data structure, supported by the computing resources of the cloud 102, which stores the results of the processes 108 until forwarded to the process interface 112. For example, the completion queues 124 can be first-in-first-out queues.

Figure 2:
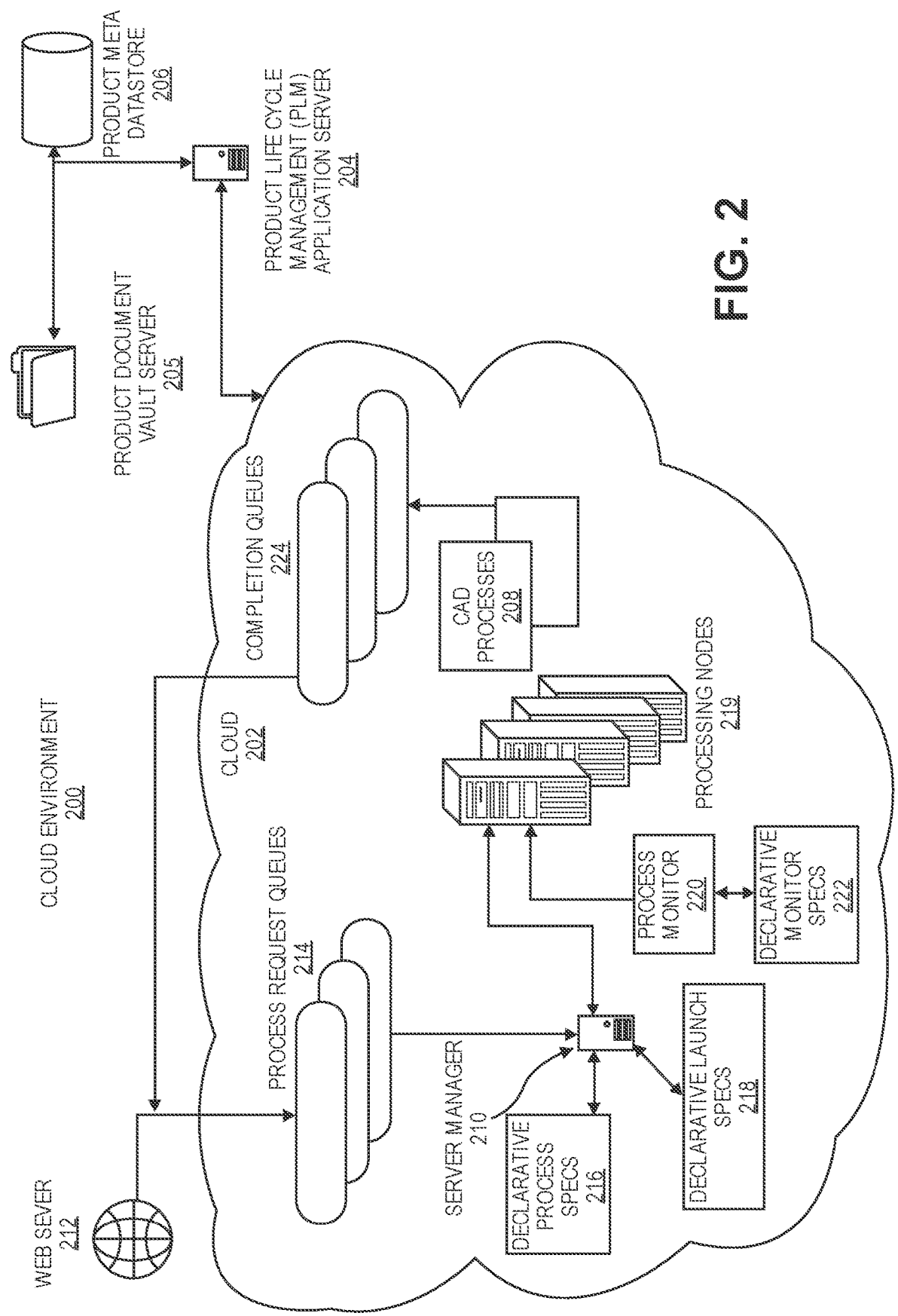
FIG. 2 illustrates an example of a cloud environment for designing, modeling, and maintaining an aircraft, according to various aspects of the present disclosure.

FIG. 2 illustrates a cloud environment 200 in which an aircraft can be designed, modeled, and maintained, according to aspects of the present disclosure. While FIG. 2 illustrates various components contained in the cloud (e.g. design) environment 200, FIG. 2 illustrates one example of a cloud environment and additional components can be added and existing components can be removed.

As illustrated in FIG. 2, the cloud environment 200 includes a cloud 202 that may comprise a number of disparate, interconnected computer network resources. The cloud 202 can be any type of architecture that combines and manages computing resources to provide flexible and configurable computer processes. In one example, the cloud 202 can be a public cloud service (e.g., Google cloud, Amazon™ EC2, etc.), a private cloud, or combination thereof. As discussed above, the cloud 202 includes a set of physical machines that can host one or more computer processes, such as one or more VMs.

In aspects, the cloud environment 200 includes one or more product design computers, such as a product life cycle management (PLM) application server, coupled to the cloud 202. The PLM application server 204 provides computer design and management for one or more aircraft. The PLM application server 204 can represent the computer systems and network hardware of an aircraft manufacturer such as the Boeing Company. The PLM application server 204 can be any type of suitable computer system that is operating in the cloud environment 100 or supporting the cloud environment 100. For example, the PLM application server 204 can include various types of servers, such as file servers, web servers, application servers, database servers, email servers and the like, that provide services within the cloud environment 100. Likewise, for example, the PLM application server 204 can include laptop computers, desktop computers, tablet computers, mobile phones, and the like used by the personnel of the entities.

The PLM application server 204 is coupled to one or more product databases such as a product document vault server 205 and a product metadata store 206. The product document vault server 205 and a product metadata store 206 can be configured to store any information on aircraft designed, manufactured, sold, etc. by the aircraft manufacturer. For example, the information can include design specifications of the aircraft, parts and components included in the aircraft, cost of manufacture of the aircraft, cost of parts and components included in the aircraft, maintenance procedures and cost of the life cycle of the aircraft, and the like. In some examples, the PLM application server 204 can also store information need for operating the CAD processes 208 on the cloud, such as computer application, computer program libraries (C++ libraries), and the like.

Additionally, for example, the cloud environment 200 includes other hardware and computer systems that support the cloud environment 200. For example, the cloud environment 200 can include gateways, routers, wireless access points, firewalls, and the like that support any type of communications network to allow the computing systems in the cloud environment 200 to communicate. In any of the examples, the computer systems, including the PLM application server 204 and the computing resources of the cloud 202, in the cloud environment 200 include hardware resources, such as processors, memory, network hardware, storage devices, and the like, and software resources, such as operating systems (OS), application programs, and the like.

According to aspects, the cloud 202 is configured to work in cooperation with the PLM application server 204 to provide flexible and configurable computing resources for designing, modeling, and managing an aircraft. For example, the cloud 202 can be configured to initiate and mange CAD processes 208 supporting the design and modeling of an aircraft. In aspects, the CAD processes 208 are configured to provide computing processing in the design and modeling of an aircraft. The CAD processes 208 can provide computing processing to support any process, action, program, and the like associated with the design and modeling of an aircraft.

To initiate and control the CAD processes 208, the cloud 202 can include a server manager 210. The server manager 210 configures and initiates the CAD processes 208 on the set of computing resources of the cloud 202. In an example, the server manager 210 can be configured as a software program that is capable of being stored on and executed by the computer resources of the cloud 202, as described above. In another example, the server manager 210 can be configured as dedicated hardware operating software programs in the cloud 202.

The server manager 210 is configured to operate, at least partially, under the control of a user. To receive input and output results to the user, the server manager 210 is configured to generate and provide a configuration interface as described above. The configuration interface can be any type of command line and/or graphical user interface (GUI) that allows the user to interact with the server manager 210.

To perform design and modeling in the cloud 202, the cloud environment 200 includes a process interface such as a web server 212. The web server 212 can be configured to receive a process request and forward the process request to the cloud 202. The web server 212 can be configured to provide any type of command line and/or GUI, for example, a web site or web interface, which allows the user to provide process requests to the cloud 202. The server manager 210 is configured to provide controls, forms, reports, etc., to allow the user to interact with the cloud 202 and perform the processes described herein.

To receive the process request, the cloud 202 includes one or more process request queues 214 accessible by the server manager 210. The process request queues 214 can be any type of data structure, supported by the computing resources of the cloud 202, which stores the process requests until retrieved by the server manager 210. For example, the process request queues 214 can be first-in-first-out queues.

Once retrieved from the process request queues 214, the server manager 210 is configured to initiate the CAD processes 208 to perform the requested process. To initiate the CAD processes 208, the server manager 210 utilizes declarative process specification 216 and declarative launch specifications 218. The declarative process specification 216 defines a protocol for communicating and converting data from the PLM application server 204, the product document vault server 205, and the product metadata store 206 to be used by the CAD processes 208 and vice versa. For example, the declarative process specification 216 can define a protocol establishes a channel (e.g., a secure channel) between the CAD processes 208 and the PLM application server 204, the product document vault server 205, and the product metadata store 206. For instance, the declarative process specification 216 can include protocols such as Simple Object Access Protocol (SOAP), remote procedure call, service Daemon, Representational State Transfer (RESTful), and the like. The declarative process specification 116 also defines conversion and interpretation of the data received from and sent to the PLM application server 204, the product document vault server 205, and the product metadata store 206.

Additionally, the declarative process specification 216 defines a protocol to translate data (parameters and requirement) from the process request into the CAD processes 208. For example, the declarative process specification 216 can define data, libraries, modules, code, and the like required by the CAD processes 208 for the process request. For example, the server manager 210 can utilize Common Request Broker Architecture (COBRA) modules that allow each of the CAD processes 208 to communicate with the PLM application server 204 in its own process address space.

The declarative launch specification 218 define hardware and software requirements for creation and initiation of the CAD processes 208. For example, the declarative launch specification 218 can define predetermined hardware resources allocation (e.g., memory requirement, CPU requirement, storage requirements, etc.) for various parameters process requests and the CAD processes 208.

To create and initiate the CAD processes 208, the server manager 210 can parse the process request and compare the parameters and requirements of the process request to the declarative process specification 216 to determine the requirements of a channel to the PLM application server 204. Likewise, the server manager 210 can parse the process request and compare the parameters of the process request to the declarative launch specifications 218 to determine an allocation of the resources of the cloud 202 (e.g., processing nodes 219) that allows the CAD processes 208 to execute efficiently and effectively. Once determined, the server manager 210 can initiate the CAD processes 208 and establish the channel with the PLM application server 204, the product document vault server 205, and the product metadata store 206. The channel can be isolated and independent from other channels from processes in the cloud 202.

The cloud 202 includes a process monitor 220. The process monitor 220 can monitor the CAD processes 208 for one or more events, such as an error, an over utilization of computing resources, and an underutilization of computing resources, and the like. In an example, the process monitor 220 can be configured as a software program that is capable of being stored on and executed by the computer resources of the cloud 202, as described above. In another example, the process monitor 220 can be configured as dedicated hardware operating software programs in the cloud 202.

The process monitor 220 can access declarative monitor specifications 222. The declarative monitor specifications 222 can define various events that occur in the CAD processes 208 and solutions for addresses the events. For example, the declarative monitor specifications 222 can define common errors that occur in the operation of the CAD processes 208 and solutions for addressing the errors such as pointer errors, PLM connectivity failures, vault failures, and the like. Once the process monitor 220 detects an event, the process monitor 220 can access the declarative monitor specifications 222 to identify the event and take actions to address the event. In some examples, the process monitor 220 can communicate with the server manager 210 to address a detected event. For example, if the CAD processes 208 are experiencing a slowdown in processing, the process monitor 220 can communicate with the server manager 210 to allocate additional resources of the cloud 202 to the CAD processes 208.

The cloud 202 also includes one or more completion queues 224. The completion queues 224 can be configured to store the results of the CAD processes 208. The completion queues 224 can be any type of data structure, supported by the computing resources of the cloud 202, which stores the results of the CAD processes 208 until forwarded to the web server 212. For example, the completion queues 224 can be first-in-first-out queues.

Figure 3:
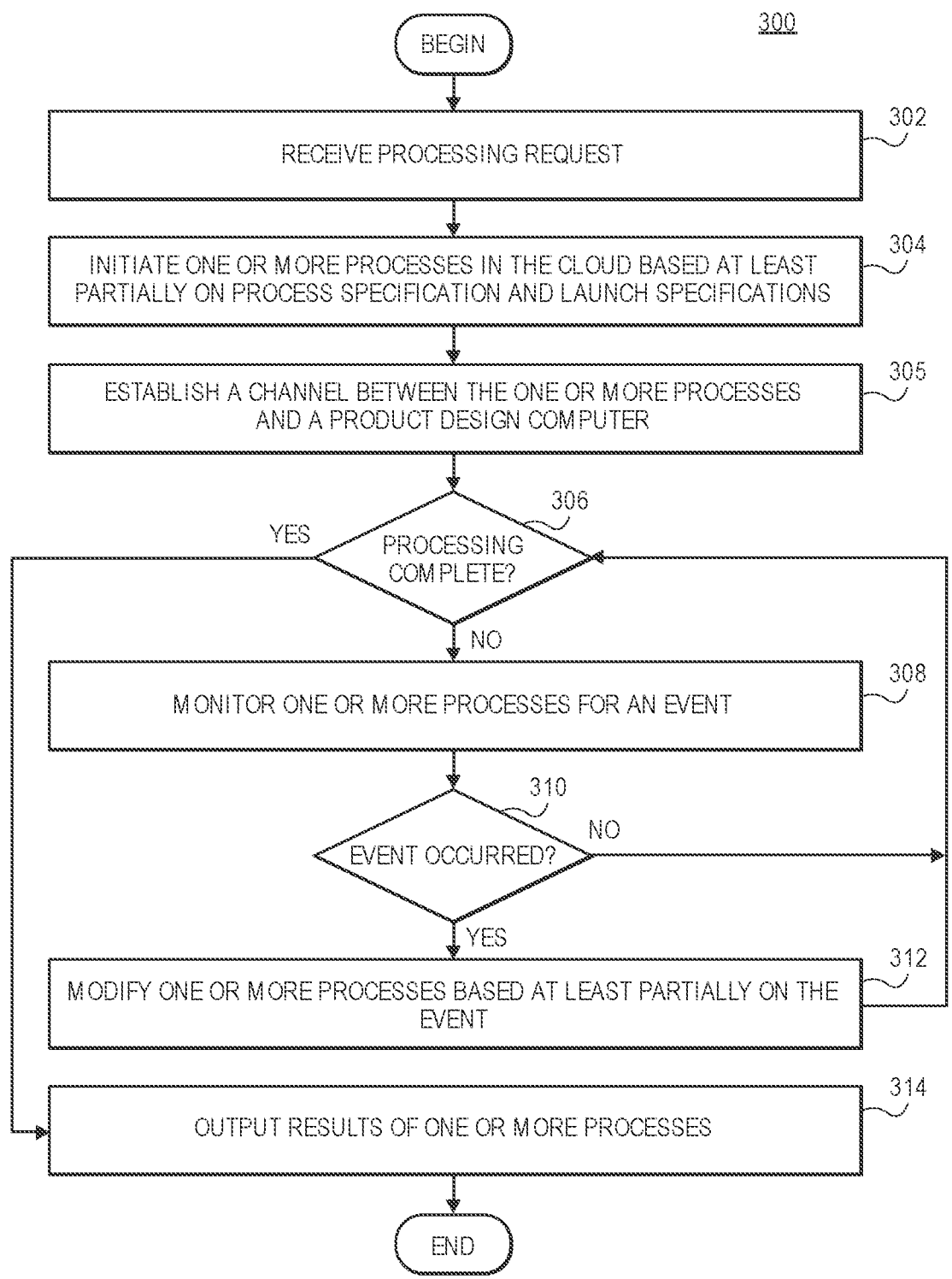
FIG. 3 illustrates an example of a process of designing, modeling, and maintaining a product in a cloud environment, according to various aspects of the present disclosure.

FIG. 3 illustrates an example of a process 300 for designing a product in a cloud environment, according to aspects of the present disclosure. While FIG. 3 illustrates various stages that can be performed, stages can be removed and additional stages can be added. Likewise, the order of the illustrated stages can be performed in any order.

After the process begins, in 302, a processing request is received. The processing request includes the details and the specifications of a modeling, design, or management processes to be executed in a cloud environment.

For example, a design engineer may be designing an aircraft using the cloud environment 200. For instance, the design engineer may desire to change the design or shape of a wing on the aircraft and produce a visualization model of the change. The design engineer can enter the design change as a process request via the web server 212 and the process request can be forwarded to the process request queues 214.

In 304, the process manager initiates one or more processes in the cloud based at least partially on process specification and launch specifications. In 305, the process manager establishes a channel between the one or more processes and the product design computer.

For example, the server manager 210 can parse the process request and compare the parameters and requirements of the process request to the declarative process specification 216 to determine the requirements of a channel to the PLM application server 204. Likewise, the server manager 210 can parse the process request and compare the parameters of the process request to the declarative launch specifications 218 to determine an allocation of the resources of the cloud 202 (e.g., processing nodes 219) that allows the CAD processes 208 to execute efficiently and effectively. Once determined, the server manager 210 can initiate the CAD processes 208 and establish the channel with the PLM application server 204, the product document vault server 205, and the product metadata store 206. The channel can be isolated and independent from other channels from processes in the cloud 202.

In 306, the processes are monitored for completion. In one example, the process manager 110 (or server manager 210) can monitor the processes 108 (process 208) for completion.

In another example, the process monitor 120 (or process monitor 220) can monitor the processes 108 (process 208) for completion.

If the processes are not complete, in 308, the process monitor monitors the process during execution for an event. If an event is not detected, in 310, the method 300 return to 306 and continues to execute until the process is complete, while continuing to monitor the processes for an event. If an event is detected in 310, the process monitor modifies one or more of the processes based at least in part on the event, in 312. Once an event is detected, the process monitor 120 can retrieve the monitor specification and determine one or more action to address the event.

For example, in the above example, the declarative process monitor 220 can detect an error in the CAD processes 208. The declarative process monitor 220 can retrieve the declarative monitor specifications 222 and determine one or more actions to address or resolve the errors. In one example, the declarative monitor specification 222 can store faults or failures (e.g., 22 faults) in CAD processes 208 when utilizing the data from the PLM application server (e.g., interoperability faults) and/or the CAD processes 208 executing in the cloud 102 (e.g., hardware or software faults). In some example, the declarative monitor specification 222 can include a fault resilient model.

In another example, the declarative process monitor 220 can detect that the CAD processes 208 are running slowly. The declarative process monitor 220 can retrieve the declarative monitor specifications 222 and determine one or more actions to address or resolve the underutilization of resources of the cloud 202. For instance, the declarative process monitor 220 can forward details of the underutilization of resources to the sever manager 210 and the server manager 210 can allocate additional resources to the CAD processes 208.

In 314, if the processes are complete, the results of the one or more processes can be output. In one example, the results can be stored in the completion queues 124 (completion queues 224) and returned to the processes interface 112. For instance, in the above example, the visualization model of the design change can be stored in the completion queues 224 and returned to the web server 212.

Figure 4:
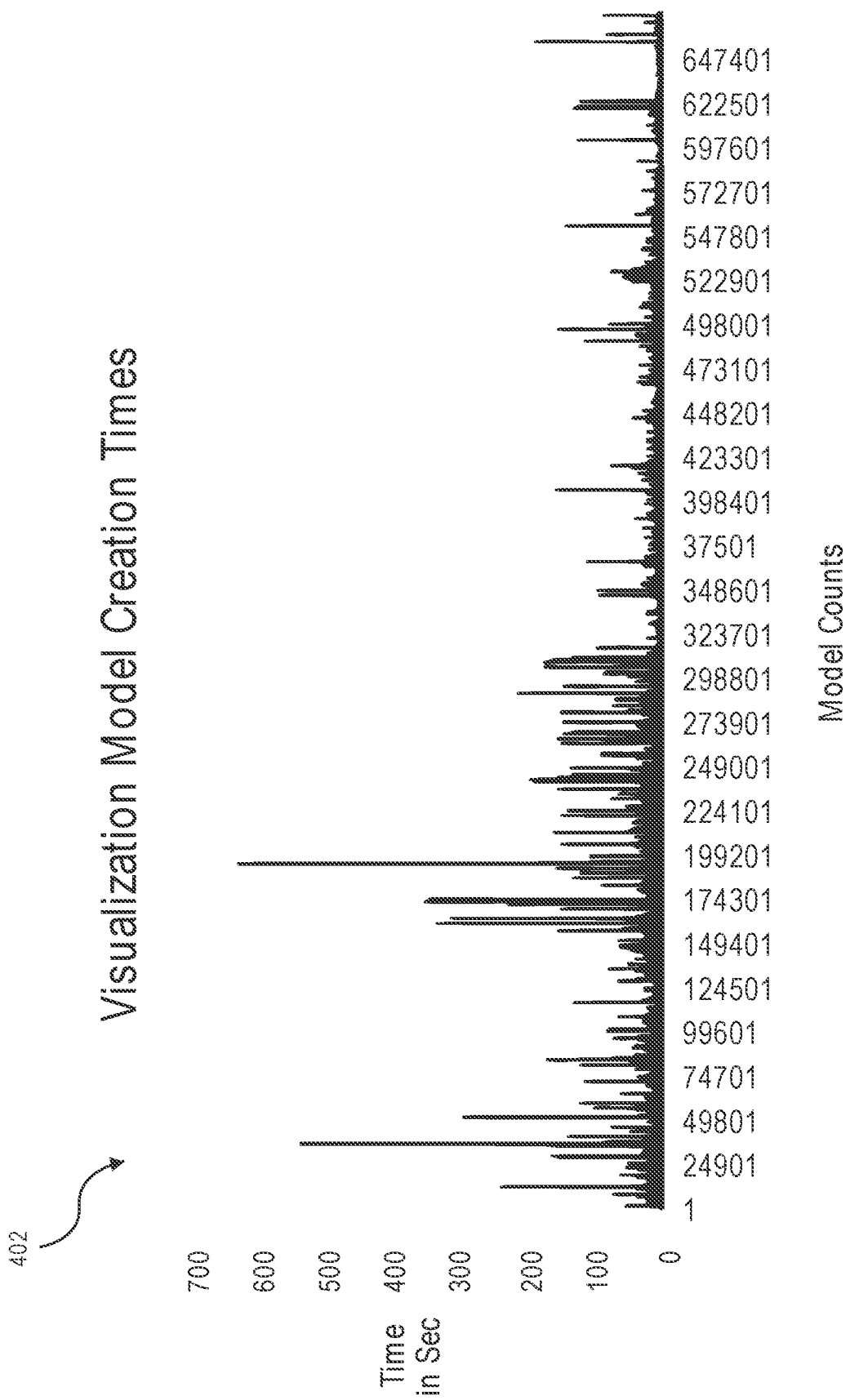
FIG. 4 illustrates an example of processing times for designing a product in a cloud environment, according to various aspects of the present disclosure.

FIG. 4 illustrates an example of processing times for designing a product in a cloud environment, according to various aspects of the present disclosure. As illustrated, a graph 402 shows creation time of various visualization models using the cloud environment 200 illustrated in FIG. 2. In this example, the cloud environment processed ~2+Million design iterations, with 98% of model generations completing in 3 min or less. As an estimate, savings from engineering hours alone can be 1200 hours/year. As such, the cloud environment 200 can create heterogeneous PLM integration solution that enables multiple airplane program visualization clients running concurrently on the same machine at the same time and solves configuration challenges between CAD (e.g., over 2 k environment settings for CAD system), PLM Application Servers (e.g., 100 s of settings) and PLM Portal. The cloud environment 202, via the sever manager 210, incorporates a new InterLanguage protocol between PLM's, CAD System (C++), and Cloud Infrastructure (.NET) and extends to JavaEE. The cloud environment 202, via the process monitor 220, achieves fault resilient PLM Visualization Model Creation Interoperability running on commodity hardware and implements methodology to capture all failures types (~22) to develop a fault resilient model and debugging including PLM interoperability debugging. This allows a six (6) sigma (99.99966%) reliability of the processes running on the cloud 102. By using a cloud 102, a scalable solution is created without increasing complexity that includes horizontal scalability (more commodity hardware can be very easily added) and vertical scalability (faster CPUs). Additionally by using a pool of resources, single CPU/server failure cannot bring the system down and, during disaster recovery mode, a single client node can support multiple programs there by improving response time. Additionally by using a pool of resources, faster deployment with software upgrades across multiple processing nodes can be achieved.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any suitable processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 5:
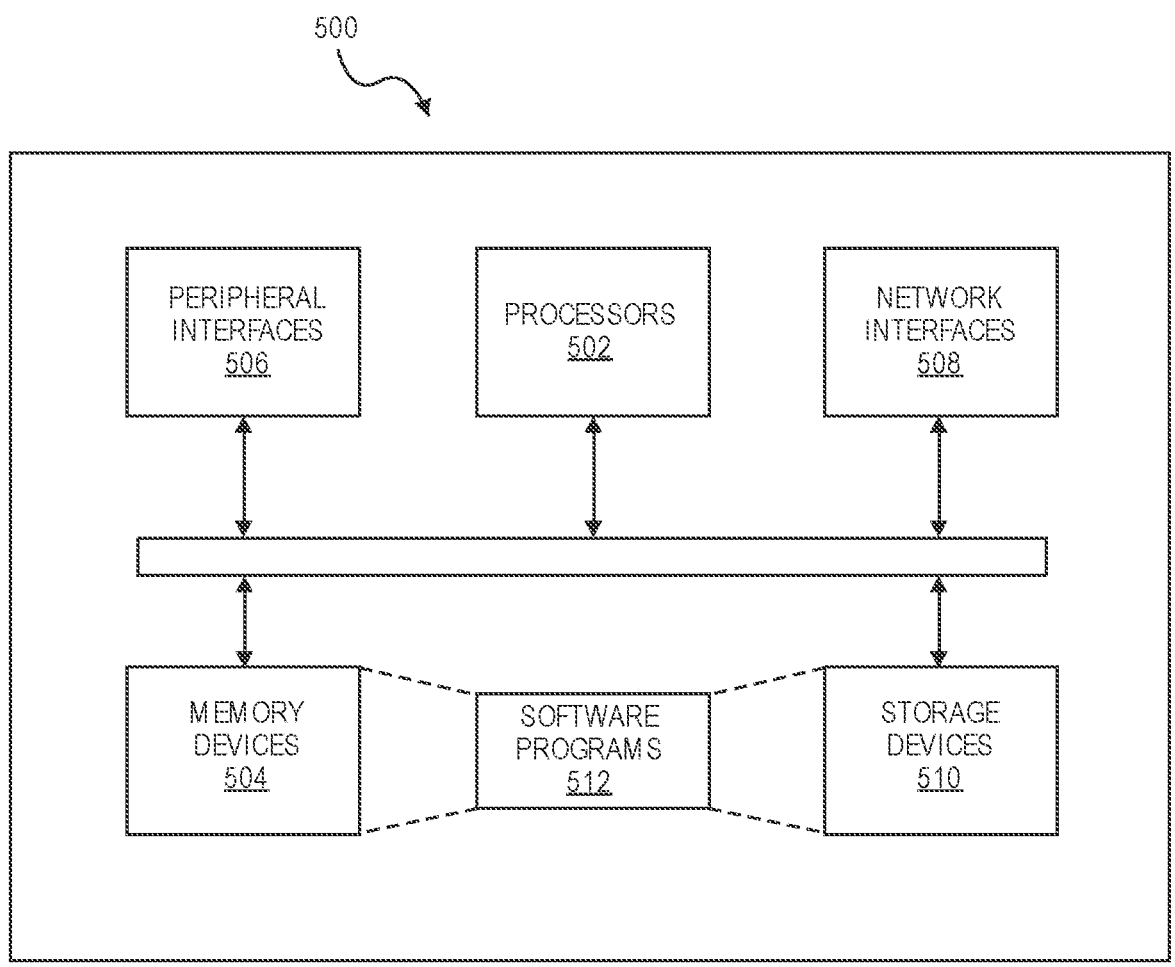
FIG. 5 illustrates an example of a hardware configuration for a computer device, according to various aspects of the present disclosure.

For example, FIG. 5 illustrates an example of a hardware configuration for the set of physical machines in the cloud 102, the cloud 202, the product design computers 104, and/or PLM application server 204. While FIG. 5 illustrates various components contained in the computer device 500, FIG. 5 illustrates one example of a computer device and additional components can be added and existing components can be removed.

The computer device 500 can be any type of computer device. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports a particular product design such as a battery design tool 104 can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks such as Ethernet adapters, wireless transceivers, or serial network components, for communicating over wired or wireless media using protocols. The computer device 500 can also include one or more storage devices 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data utilized by one or more software programs 512 can be stored in the one or more memory devices 504 and/or on in the one or more storage devices 510.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network (SAN) familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise a random access memory (RAM), a read only memory (ROM), a flash memory, an electrically erasable programmable read only memory (EEPROM), a compact disc read only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Figure 6:
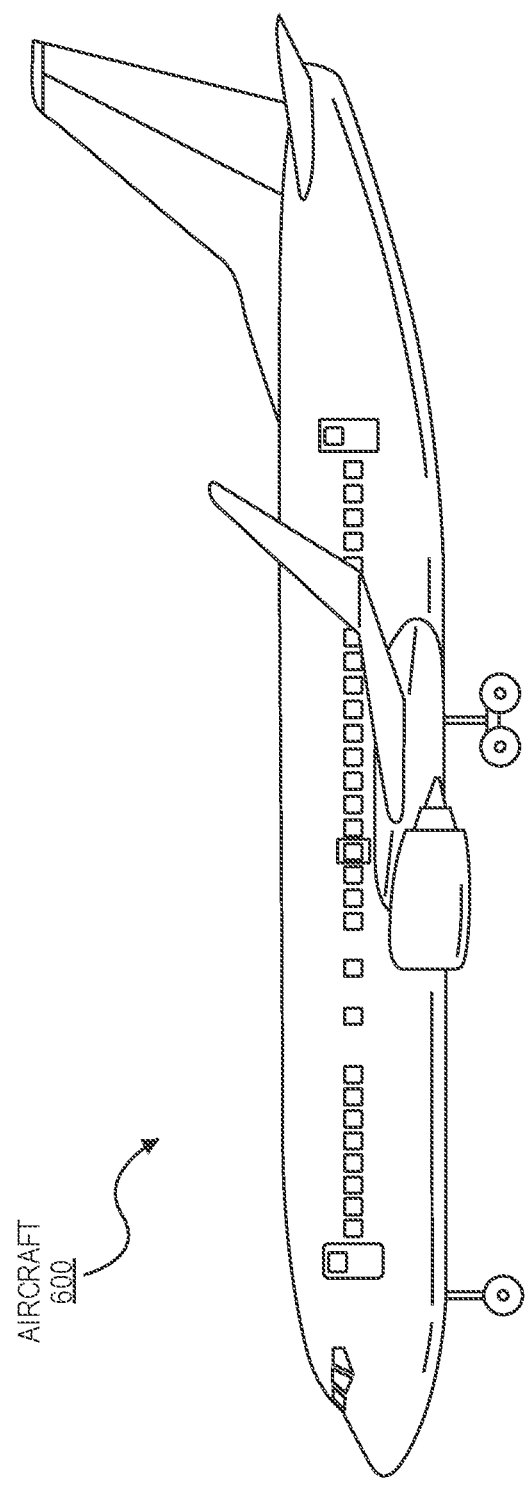
FIG. 6 illustrates an example of a product that can be designed in a cloud environment, according to various aspects of the present disclosure.

In the aspects described above, the cloud environment 100 or the cloud environment 200 can be utilized in designing, re-designing, modeling, revising, and managing products offered by an entity. FIG. 6 illustrates one example of a product that can be designed, re-designed, modeled, revising, and managed. As illustrated in FIG. 6, an aircraft 600 can be designed, re-designed, modeled, revising, and managed utilizing the cloud environment 100 or the cloud environment 200.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method comprising:
receiving a processing request associated with a design or modeling of a product;
initiating one or more processes in a cloud for the processing request, wherein resources of the cloud are allocated based at least partially on requirements of the processing request and launch specifications;
defining a protocol that is used to establish a channel between the one or more processes and a product design computer based at least partially on a process specification to communicate in a unique process address space, wherein the process specification defines a type of the channel, a type of the protocol for conversion, and interpretation of the data received via the channel that allow the one or more processes to communicate with the product design computer and the defining the protocol that is used to establish the channel comprises:
determining requirements of the channel by comparing the requirements of the process request to the process specification,
determining the allocation of the resources of the cloud by comparing the requirements of the process request to the launch specifications,
wherein the product design computer is located remotely from the cloud, and
wherein the protocol translates data communicating through the channel and between the one or more processes and the product design computer based on the protocol defined by the process specification;
and outputting a result of the one or more processes to a requester associated with the process request.

2. The method of claim 1, the method further comprising:
monitoring the one or more processes for an event;
and modifying, in response to a detection of the event, the one or more processes to address the event,
wherein a second protocol for translating data from the process request into the one or more processes is defined by the process specification and the second protocol further defines one or more first parameters for translating the data, the one or more first parameters comprising at least one of:
data,
a library,
a module, and
code,
wherein the launch specifications define one or more second parameters for the process request, the one or more second parameter comprising at east one of:
a memory requirement;
a CPU requirement;
and a storage requirement.

3. The method of claim 2, wherein the event comprises an error and wherein the one or more processes are modified to debug the error,
wherein the determining requirements of the channel further comprises parsing the process request to compare the requirements of the process request to the process specification, and
wherein the determining the allocation of the resources of the cloud further comprises parsing the process request to compare the requirements of the process request to the launch specifications.

4. The method of claim 2, wherein the event comprises an over utilization of the resources of the cloud and wherein the one or more processes are modified to allocate additional resources to the one or more processes.

5. The method of claim 1, wherein the product is an aircraft and wherein the result is a visualization model of the aircraft.

6. The method of claim 1, wherein the one or more processes are computer aided design processes and wherein the product design computer are product lifecycle management server.

7. The method of claim 1, wherein:
the channel is a first channel and is isolated from a second channel between the cloud and the product design computer.

8. A system comprising:
one or more memory devices storing instructions;
and one or more processors coupled to the one or more memory devices and configured to execute the instructions to perform a method comprising:
receiving a processing request associated with a design or modeling of a product;
initiating one or more processes in a cloud for the processing request, wherein resources of the cloud are allocated based at least partially on requirements of the processing request and launch specifications;

defining a protocol that is used to establish a channel between the one or more processes and a product design computer based at least partially on a process specification to communicate in a unique process address space, wherein the process specification defines a type of the channel, a type of the protocol for conversion, and interpretation of the data received via the channel that allow the one or more processes to communicate with the product design computer and the defining the protocol that is used to establish the channel comprises:

determining requirements of the channel by comparing the requirements of the process request to the process specification, determining the allocation of the resources of the cloud by comparing the requirements of the process request to the launch specifications, wherein the product design computer is located remotely from the cloud, and wherein the protocol translates data communicating through the channel and between the one or more processes and the product design computer based on a protocol defined by the process specification;

and outputting a result of the one or more processes to a requester associated with the process request.

9. The system of claim 8, the one or more memory devices storing additional instructions to perform the method further comprising:

monitoring the one or more processes for an event;

and modifying, in response to a detection of the event, the one or more processes to address the event, wherein a second protocol for translating data from the process request into the one or more processes is defined by the process specification and the second protocol further defines one or more first parameters for translating the data, the one or more first parameters comprising at least one of:

data, a library, a module, and code, wherein the launch specifications define one or more second parameters for the process request, the one or more second parameter comprising at least one of:

a memory requirement;
a CPU requirement;
and a storage requirement.

10. The system of claim 9, wherein the event comprises an error and wherein the one or more processes are modified to debug the error, wherein the determining requirements of the channel further comprises parsing the process request to compare the requirements of the process request to the process specification, and wherein the determining the allocation of resources further comprises parsing the process request to compare the requirements of the process request to the launch specifications.

11. The system of claim 9, wherein the event comprises an over utilization of the resources of the cloud and wherein the one or more process are modified to allocate additional resources to the one or more processes.

12. The system of claim 8, wherein the product is an aircraft and wherein the result is a visualization model of the aircraft.

13. The system of claim 8, wherein the one or more processes are computer aided design processes and wherein the product design computer are product lifecycle management server.

14. The system of claim 8, wherein the channel is isolated from another channel between the cloud and the product design computer.

15. A non-transitory computer readable medium storing instructions for causing one or more processors to perform a method, the method comprising:

receiving a processing request associated with a design or modeling of a product;

initiating one or more processes in a cloud for the processing request, wherein resources of the cloud are allocated based at least partially on requirements of the processing request and launch specifications;

defining a protocol that is used to establish a channel between the one or more processes and a product design computer based at least partially on a process specification to communicate in a unique process address space, wherein the process specification defines a type of the channel, a type of the protocol for conversion, and interpretation of the data received via the channel that allow the one or more processes to communicate with the product design computer and the defining the protocol that is used to establish the channel comprises:

determining requirements of the channel by comparing the requirements of the process request to the process specification, determining the allocation of the resources of the cloud by comparing the requirements of the process request to the launch specifications, wherein the product design computer is located remotely from the cloud, and wherein the protocol translates data communicating through the channel and between the one or more processes and the product design computer based on a protocol defined by the process specification;

and outputting a result of the one or more processes to a requester associated with the process request.

16. The non-transitory computer readable medium of claim 15, the method further comprising:

monitoring the one or more processes for an event;

and modifying, in response to a detection of the event, the one or more processes to address the event, wherein a second protocol for translating data from the process request into the one or more processes is defined by the process specification and the second protocol further defines one or more first parameters for translating the data, the one or more first parameters comprising at least one of:

data,
a library,
a module, and
code, wherein the launch specifications define one or more second parameters for the process request, the one or more second parameter comprising at east one of:

a memory requirement;
a CPU requirement;
and a storage requirement.

17. The non-transitory computer readable medium of claim 16, wherein the event comprises an error and wherein the one or more processes are modified to debug the error, wherein the determining requirements of the channel further comprises parsing the process request to compare the requirements of the process request to the process specification, and wherein the determining the allocation of resources further comprises parsing the process request to compare the requirements of the process request to the launch specifications.

18. The non-transitory computer readable medium of claim 16, wherein the event comprises an over utilization of the resources of the cloud and wherein the one or more processes are modified to allocate additional resources to the one or more processes.

19. The non-transitory computer readable medium of claim 15, wherein the product is an aircraft and wherein the result is a visualization model of the aircraft.

20. The non-transitory computer readable medium of claim 15, wherein the one or more processes are computer aided design processes and wherein the product design computer are product lifecycle management server.

\* \* \* \* \*

UNITED STATES PATENT AND TRADEMARK OFFICE
CERTIFICATE OF CORRECTION

| | | |
|---|---|---|
| PATENT NO. | : 10,929,573 B2 | Page 1 of 1 |
| APPLICATION NO. | : 15/464788 | |
| DATED | : February 23, 2021 | |
| INVENTOR(S) | : Narasimha Murthy Kanuparthy et al. | |

It is certified that error appears in the above-identified patent and that said Letters Patent is hereby corrected as shown below:

In the Claims

Column 14, Line 29, Claim 2: delete "east", and insert therefor --least--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*